June 28, 1927.

G. W. BEATTIE

IRRIGATING AND MINING WATER METER

Filed Sept. 16, 1922

Witness
C. C. Holly

Inventor
George W. Beattie
James R. Townsend
his atty

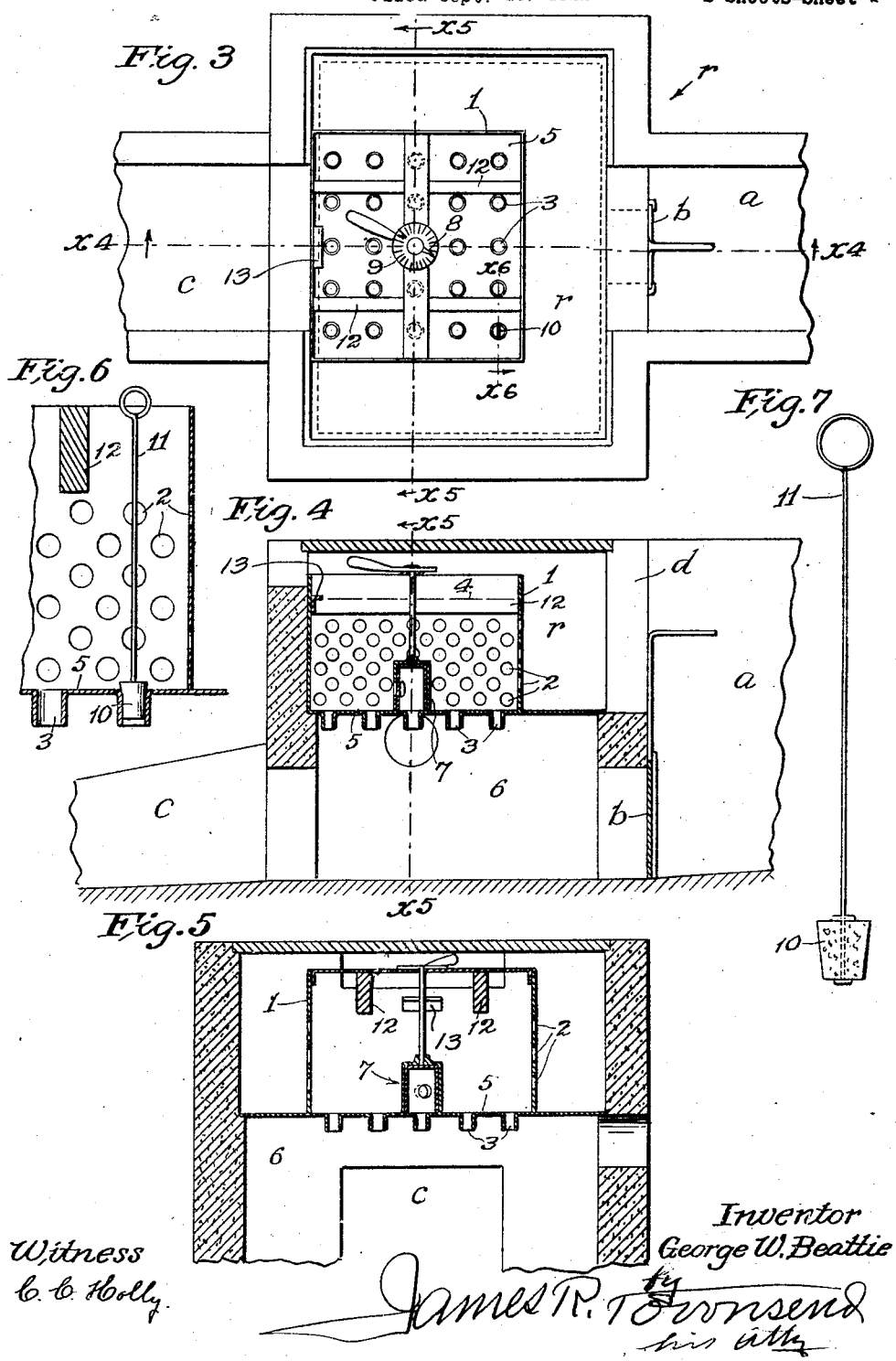

Patented June 28, 1927.

1,634,011

UNITED STATES PATENT OFFICE.

GEORGE W. BEATTIE, OF HIGHLAND, CALIFORNIA.

IRRIGATING AND MINING WATER METER.

Application filed September 16, 1922. Serial No. 588,712.

This invention relates to devices for determining the amount of water carried by a stream, the surface of which is open to atmospheric pressure.

It is customary to measure such streams, or water from such streams, by reference to a predetermined unit such as the unit known as the miner's inch.

The old miner's inch of water was defined as the amount of water that would pass through an opening one inch square under a given head. In using this unit of measurement, it was customary to permit water to flow through openings of various sizes, assuming that since one miner's inch flowed through an opening one inch square, two miner's inches would flow through an opening of two square inches, or ten miner's inches through an opening of ten square inches, and so forth.

An inherent defect in this method lies in the fact that no multiple of an opening one inch square will determine the passage of a proportional quantity of water, since conditions vary with openings of different sizes. For example, an opening of one inch has a perimeter of four inches with a corresponding degree of friction and current deflection. An opening one inch by two gives a cross section area of two square inches with a perimeter of six inches, and more than twice as much water will pass through such an opening as will flow through an opening one inch square.

In consequence of these inaccuracies inherent in the old method of measuring the miner's inch, it has become customary in irrigation regions to measure water by a weir and to calculate the flow from the depth and width of the stream passing over the weir. Such present method is subject to inaccuracies on account of varying velocities and directions of the water entering the box above the weir.

I have discovered that inaccuracies can be practically eliminated by discharging the water from the measuring box through multiple outlets, the discharge capacities of each of said outlets being accurately determined and uniform throughout.

An object of this invention is to provide means by which the exact amount of water either by weight or by cubic measurement flowing through the meter in a given time can be determined.

I have discovered that by providing a meter box with a divided outlet means in the bottom thereof and inlet and baffle means below the liquid level of the box, adapted to prevent currents inside the box, that the outflow through the outlet means at a determined depth of the liquid in the box above the outlet will give an invariable flow through the outlet, and in carrying out this invention the meter box may be variously constructed.

An object of the invention is to provide a meter box of this description which will be cheap, simple and easy to construct and with which the measurement may be determined to any practical fraction of the weight or cubic measurement of the water.

Another object of the invention is to make provision whereby measurements of the flow of large streams may be accurately determined with comparatively small metering apparatus.

Other objects, advantages and features of invention may appear from the accompanying drawings, the subjoined detail description and the appended claims.

The accompanying drawings illustrate the invention.

Fig. 3 is an enlarged plan of the meter proper, shown in Figs. 1 and 2.

Fig. 4 is a section on line $x^4$, Fig. 3, looking in the direction of the arrows.

Fig. 5 is a section on line $x^5$, Figs. 3 and 4, looking in the direction of the arrows, and showing an enlarged detail of means for minute regulation of the outlet means.

Fig. 6 is a fragmental section on line $x^6$, Fig. 3, showing a plug, used for regulating the outflow from the meter box, in position.

Fig. 7 is an enlarged side view of the plug shown in Fig. 6.

Figure 1:
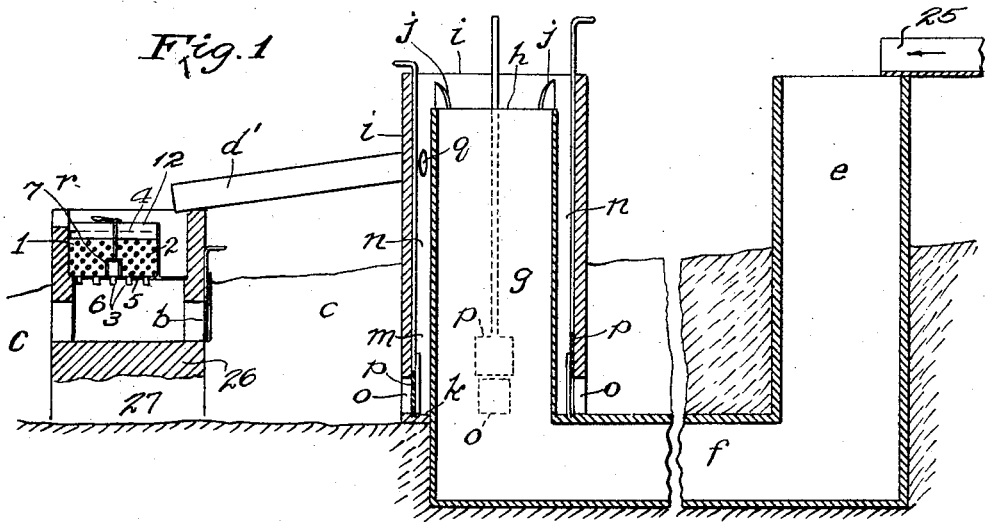
Figure 1 is a view in vertical section of a metering apparatus constructed in accordance with this invention and adapted to the measurement of large water flow.
Figure 2:
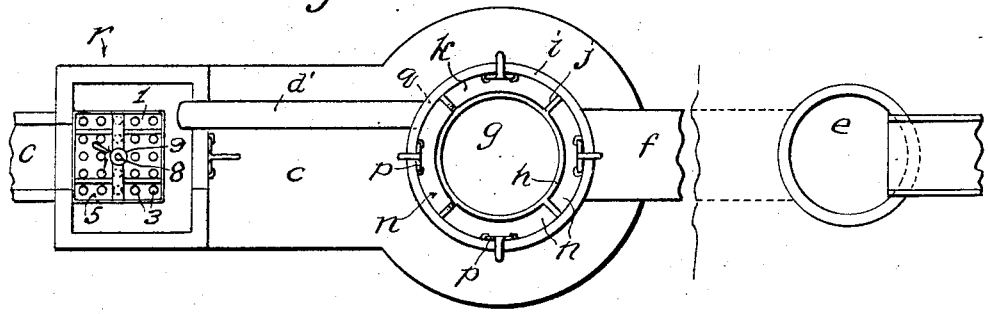
Fig. 2 is a fragmental plan of the same.

First referring particularly to the form shown in Figs. 3, 4, 5 and 6; $a$ is the ditch or the conduit from which the water normally flows through the head gate $b$ to the user's flume or ditch $c$ when the meter is not in use. $d$ is the inlet from the conduit $a$, to the measuring apparatus. Said inlet to the measuring apparatus is above the level of the head gate $b$ and of the outlet 3 to the flume or user's ditch $c$ and the water is diverted from the conduit $a$ to the measuring apparatus by closing the head gate $b$, thus raising the water to the level of the inlet $d$ of the measuring apparatus. In Figs. 1 and 2 the inlet $d'$ may be connected by any suitable means to receive liquid from the dividing apparatus shown in Figs. 1 and 2 in which water is received from any suitable source, such as the trough or pipe 25, and delivered into the stand pipe $e$ leading to horizontal pipe $f$ which leads to a second or inner stand pipe $g$ that terminates in a level top $h$ within an outer stand pipe $i$ and below the level of the top thereof. Said stand pipe $i$ is provided with a dividing partition $j$ extending from the bottom $k$ of the inner stand pipe space $m$ to above the level of the top $h$ of the inner stand pipe $g$ so that the water which flows over the top of the inner stand pipe will be separated into definite fractions of the whole stream as it flows from the inner stand pipe.

Each of the descending ways $n$, thus formed between the pipes, is provided below the level of the top of the inner pipe and approximately at the bottom of the ditch $c$, with an outlet $o$ through which the water normally escapes to the irrigation ditch $c$. Each of the outlets $o$ is provided with a gate $p$ adapted to close the outlet, thus raising the water in the chamber $n$ from which the closed outlet discharges. $q$ indicates an outlet from the chamber $n$ into the inlet $d'$ leading to the meter box $r$.

In Figs. 1 and 2 the meter $r$ shown in Figs. 3–6 is placed in the ditch $c$ and mounted upon any suitable support 26 that has an opening 27 underneath it so that water entering the ditch $c$ from the outlets $o$ may freely pass through and along the ditch $c$. The head gate $b$ may be closed as shown in Fig. 1, when the meter is used in this manner.

1 is the stilling box in the meter box $r$. The side walls of the stilling box are provided with inlet means in the form of orifices 2 adapted to admit water quietly to the stilling box. 3 indicates outlet means to discharge water from the stilling box. Exits from the stilling box are arranged below a predetermined water level 4 so that during the operation of the meter, said exits will be submerged. Such submergence is relative to the volume of flow and the size of, and the depth to which, such exits are submerged.

Preferably the exits are arranged in a horizontal plane and, as shown, they are arranged in the bottom 5 of the stilling box and above an open air chamber 6 into which the water flows from said outlet means 3.

The outlets are shown in the drawings as accurately made of uniform size and may be of any suitable form and are of small diameter. They may be made of brass or bronze tubing or other suitable material.

The combined flow capacity through the orifices of the outlet means will be in such relation to the flow into the meter box $r$ as to cause the water in box $r$ and in the stilling chamber 1 to rise to a height above the outlet, sufficient to cause the flow through the outlet means to equal the flow into the box 1. By catching and weighing the water which flows through the meter in a given time, the outflow under a certain head is determined at the time of manufacturing the boxes, and such determination is made by catching the outflow and weighing or measuring it.

It is desirable in practical use, that each exit of the outlet means shall deliver a predetermined unit when the water in the stilling box stands at a predetermined level; for example, one miner's inch or one-fiftieth of a cubic foot, is equivalent to a flow of 75 pounds of water per minute. By making the outlet units or nozzles 3 to accurately correspond with each other the number of outlets in use indicates the amount of flow per minute, and in this particular case would indicate the number of miner's inches flowing through the meter.

In order to secure accurate measurement of flow in which there is a fraction of a unit, I provide one of the outlets with a cut-off 7 and provide such cut-off with an index 8 working over a dial 9, whereby the fraction of the flow can be determined by closing such outlet sufficiently to bring the water in the stilling box to the predetermined level indicated by the head gage 13. If the cut-off is not sufficient to properly regulate the flow, one or more of the outlets 3 may be plugged by inserting a plug 10 in the outlet. Said plug 10 is provided with a handle 11 for easy insertion or removal of the plug, thus serving the function of a cock.

In the event of manufacture, the meters will all be made to standard, and by use of the stream-dividing device above described, which delivers the water to the meter proper, it is only necessary to measure a predetermined fraction of the entire flow.

It is necessary, in order to secure perfect measurements, that all whirlpool effects be guarded against, and this is done by means of baffle plates 12 extending down below the predetermined water level 4 in the stilling box.

I have found that by applying the baffle boards 12 inserted edgewise into the top of the water contained in the measuring box 1, the tendency of the water to whirl in such box is avoided and the outflow through the various nozzles 3 is uniform.

In practical use when water is flowing through the intake, the mere closing of a sufficient number of the small holes in the bottom of the meter box 1 will raise the water in the meter to a predetermined height and if seventy-five pounds of water will then pass through one nozzle or hole in one minute, it is found that exactly ten times as many pounds will pass through ten holes or nozzles in the same time because the conditions of flow are the same at each hole. An accurate measure of any stream flowing through the meter is therefore determined by the number of open holes.

I claim.

1. A water meter comprising a stilling box having inlet means and outlet means, the flow capacity of said outlet means being in such relation to the flow capacity of the inlet means that liquid will rise to a height above the outlet means sufficient to cause the flow through the outlet means to equal the flow through the inlet means; means to regulate the outflow to cause the water to rise to a predetermined level in said stilling box; and means extending below the predetermined water level adapted to prevent whirlpool effects, said outlet means arranged above an open air chamber.

2. A water meter comprising a meter box, stilling box arranged in the meter box and having inlet means from the chamber of the meter box, and outlet means to the open air, the flow capacity of said outlet means being in such relation to the flow capacity of the inlet means that liquid will rise to a height above the outlet means sufficient to cause the flow through the outlet means to equal the flow through the inlet means.

3. A stilling box provided with inlet and outlet means, the latter consisting of a series of small uniform holes in the bottom of the box, discharging freely in the open air and baffles extending below the water level of the stilling box to prevent whirlpool effects in the stilling box.

4. A water meter comprising a stilling box, said box having inlet orifices therein, and a plurality of uniform sized outlets in the bottom thereof; and cut off means adapted to be mounted over one of said outlets.

5. A water meter comprising a stilling box, said box having inlet orifices therein, and a plurality of uniform sized outlets in the bottom thereof; cut off means mounted over an outlet; and means to adjust said cut off to vary the flow through the said outlets and maintain a uniform level of water in said box.

In testimony whereof, I have hereunto set my hand at Los Angeles, California, this 6th day of September, 1922.

GEORGE W. BEATTIE.